UNITED STATES PATENT OFFICE.

MARK H. LACKERSTEEN, OF CHICAGO, ILLINOIS.

PROCESS OF TREATING FATS AND OILS.

SPECIFICATION forming part of Letters Patent No. 284,862, dated September 11, 1883.

Application filed June 8, 1882. Renewed June 22, 1883. (No specimens.)

*To all whom it may concern:*

Be it known that I, MARK HENRY LACKERSTEEN, of Chicago, in the county of Cook and State of Illinois, have invented a certain new and useful Process of Treating Fats and Oils for the Manufacture of Soap, Candles, and Glycerine; and I hereby declare that the following is a full, clear, and exact description of my invention, which will enable others skilled in the art to which it appertains to make and use the same.

The object of the present invention is to provide a better, cheaper, and more expeditious process for the preparation of the fatty acids and glycerine than those hitherto in use, and one whereby said products may be obtained in a more pure and fit state for the various purposes for which they are used.

Heretofore in the manufacture of the fatty acids and glycerine from fats and oils various different methods have been employed, as the saponification with lime, or with lime and the application of superheated steam, or with sulphuric acid and subsequent distillation, or by means of water under high pressure, commonly known as the "Tiglman process," or by means of superheated steam and subsequent distillation, as practiced by Gynne and Wilson of Bice's Candle Company in England; but all these processes are more or less objectionable on account of the imperfect and impure quality of the glycerine and fatty acids produced, or of the time and labor consumed, or of the cost of the materials required, or on account of the high degree of heat and pressure necessary to be used, and the consequent danger of injuring or destroying the glycerine.

By means of my invention I am enabled to convert neutral fats or oils into glycerine and the fatty acids without the use of any alkali or acids, so that the stock produced is not impregnated with chemicals, and without employing the high temperatures and pressure necessary in the superheated steam or water process, and in less than one-fourth the time required by any process, consistent with safety, heretofore in use; and to such end my invention consists in mixing with the fat or oil the necessary quantity of water to furnish the lacking elements of the fatty acids and glycerine, and then effecting the chemical changes necessary to convert such mixture into the fatty acids and glycerine by the application of electro-motive force. About one hundred parts of neutral fat and six parts of water are necessary to produce one hundred and six parts of fatty acids and glycerine, so that the water is as essential an element as the fat or oil itself to produce the fatty acid and glycerine. As the fat or oil will not readily mix with water when cold, it is necessary of course to heat the same to some extent in order to produce an intimate mechanical mixture.

In practicing my invention I put the melted fat or oil to be treated in any suitable vessel or tank, add thereto a sufficient quantity of water and intimately mix the two together, so as to form a complete emulsion of the water and fat, when I pass a strong current of electricity through the emulsion, which, by electrolysis sets free the oxygen and hydrogen of the water and causes the neutral fat to undergo the chemical changes, producing the fat-acids and glycerine. The source of the electric force may be any kind of an electrical battery or dynamo-machine of sufficient power to produce electrolysis; but I prefer to use a secondary or storage battery. Faure's secondary battery answers remarkably well. I may mention that about twelve per cent. is about the least quantity of water that the fat must be made to take up in the emulsion, as that amount of water represents or supplies about the quantity of oxygen and hydrogen required to change the neutral fat into the fatty acids and glycerine. It is preferable, however, to add a somewhat greater proportion of water than twelve per cent., for the reason that if the emulsion contains a much less percentage of water some part of the fat will necessarily not be converted into fat-acids and glycerine, whereas the only effect of a greater proportion of water is to make the glycerine produced somewhat less concentrated in form. After the emulsion is formed the time required to convert the same by electrical action into fat-acids and glycerine is very short, a few seconds sufficing with a Faure's battery to convert one thousand pounds of fat into the corresponding amount of fat-acids and glycerine. After the digestion is completed, the electric current is broken, and then the mass is allowed to stand until the glycerine settles to the bottom, when it may be drawn off from the vessel. The emulsion of course may be formed either in a separate vessel or in the same vessel in which the electrical action is to take place. The latter I deem the more convenient method. The vessel for containing the emulsion should be either made, as usual, of copper or of iron lined with copper, and this copper lining may, if desired, form one of the electrodes of the battery. The other electrode in that case may preferably be placed near the center of the vessel, so that the electrical action will take place in radial lines. Instead of placing the opposed electrodes in a vessel, however, they may be placed in or constitute part of a tube or passage through which the emulsion is continuously or otherwise passed or forced, and the electrolysis and chemical changes effected as the emulsion is pumped through such tube, or passage; and, again, instead of sending the electric current directly through the emulsion itself, the electrolysis may be effected by passing the electric current through a quantity of water in the bottom of the vessel containing the emulsion, thus evolving oxygen and hydrogen, and as the nascent oxygen and hydrogen arise and pass through the emulsion, the neutral fat rapidly undergoes the chemical changes of oxidation and hydrogenation, producing the fat-acids and glycerine; but in this way of practicing my invention the emulsion should be kept in a constant state of agitation by stirrer-arms or other suitable means, as some considerable time is required to completely convert the fat into the fatty acids and glycerine. I however, when practicing my invention by sending the electric current through a quantity of water in the bottom of the vessel containing the emulsion, have in thirty minutes' time completely converted one thousand pounds of tallow into fatty acids and glycerine. In this case the two electrodes, consisting of a net-work of copper wire, were located near the bottom of the vessel, and above them, but not in contact with them, I had a perforated steam-coil, through which steam was blown, so as to jet upward the water and keep it or that portion of it above the electrodes constantly intermixed and emulsified with the fat, the emulsification being assisted, also, by stirrer-arms fixed to a central shaft which was revolved by machinery. The steam blown in through the perforated coil operated also to maintain the emulsion at a temperature in the neighborhood of from 250° to 350° Fahrenheit, which of course somewhat assisted or accelerated the oxygenation and hydrogenation of the fat and its conversion into glycerine and fat-acids. The pressure created by the volume of oxygen and hydrogen liberated by the electric current also accelerates the conversion of the fat into fat-acids and glycerine. The degree of pressure produced by the gases may be controlled by momentarily breaking the electric circuit from time to time, as may be required.

If the tallow to be treated is not already sufficiently clean and pure, and, in fact, ordinarily it is not, as a preliminary step in the practice of my invention, I first clean the fat, or deprive it of its impurities, by passing a current of electricity through a quantity of water in the bottom of the vessel containing the fat, so as to suddenly disengage, by electrolysis, a volume of oxygen and hydrogen, and as these gases arise through the fat, which should be kept in a state of agitation at this time, the impurities in the tallow rapidly become oxidized, and being for the most part volatile, may be readily drawn or sucked off through an exhaust-pipe at the top, by means of an exhaust-pump, or by other suitable means. During this preliminary step of depuration a small quantity of steam should be blown in through a perforated steam-coil, just above the electrodes, and the temperature and pressure of the steam should be nearly normal. I prefer to effect the depuration of the fat in the same vessel which I use for the digestion; and ordinarily, in practice, after the depuration is completed I simply turn on a greater amount of steam, sufficient to blow the water that is above the electrodes up into the fat, and thereby, in connection with the stirrer-arms, form an emulsion of the fat and water, and after the fat has in this way been made to take up about twelve per cent. of water I then effect the electrolysis, either by sending the current of electricity through the emulsion itself, which is the quicker way, or by continuing to send it between the electrodes at the bottom through the water remaining therein below the perforated steam-coil. The vessel or digester should originally be filled about seven-eighths full of water and fat—one-eighth of water at the bottom and six-eighths of fat—to allow a space at the top for expansion of the liberated gases.

I desire it to be distinctly understood that I do not limit myself herein to any particular form of apparatus, nor to any particular mode of applying the electric current to produce the electrolysis, whether it be applied to the emulsion itself directly or to water wholly or partially unmixed with fat, and the elements thus dissociated then brought in contact with or passed through the emulsion. Nor do I wish to confine myself to any particular mode of producing the emulsion.

It will of course be understood that the apparatus constitutes no part of the present invention; nor do I herein make any claim to any invention or improvements in apparatus that may be indicated herein; nor do I herein claim the process of depurating the fat herein described, except in connection with and forming a preliminary step or part of my process for converting fat or oils into fat-acids and glycerine, and all such matters which I may be entitled to claim and secure, I herein expressly reserve for other applications for Letters Patent.

I claim—

1. The process of treating fat and oils for the preparation of fat-acids and glycerine, consisting in first producing an emulsion of the fat or oil with water and then converting the same into fat-acid and glycerine by the application of electro-motive force, substantially as described.

2. The process of treating fats and oils for the preparation of fat-acids and glycerine, consisting in first depurating the fat or oil by passing a volume of steam and oxygen and hydrogen through the fat or oil, then forming an emulsion of the depurated fat or oil with water, and finally converting the same into fat-acid and glycerine by the application of electro-motive force, substantially as specified.

3. The process of treating fat and oils for manufacturing fat-acids and glycerine, consisting in the application of electro-motive force directly through an emulsion of fat or oil, with water of sufficient power to produce the dissociation of the water elements and of their simultaneous combination with the fat, substantially as specified.

MARK HENRY LACKERSTEEN.

Witnesses:
H. M. MUNDAY,
EDMUND ADCOCK.